United States Patent [19]

Hartmann

[11] Patent Number: 4,936,597
[45] Date of Patent: Jun. 26, 1990

[54] FULLY ENCLOSED MULTIPLE SPEED DRIVE FOR A CHAIN DRIVEN TANDEM BICYCLE

[76] Inventor: Dirck T. Hartmann, 4121 Morning Star Dr., Huntington Beach, Calif. 92649

[21] Appl. No.: 341,417

[22] Filed: Apr. 21, 1989

[51] Int. Cl.⁵ .............................................. B62M 1/02
[52] U.S. Cl. ..................................... 280/231; 280/261; 280/238; 475/277
[58] Field of Search ............... 280/202, 231, 236, 238, 280/261, 281.1, 304.3; 474/80, 78, 144, 146; 74/750 B, 752 B, 781 B, 766

[56] References Cited

U.S. PATENT DOCUMENTS

| | | | |
|---|---|---|---|
| 428,991 | 5/1890 | Woodward et al. | 280/231 |
| 2,385,892 | 10/1945 | Swanson | 280/231 |
| 4,706,982 | 11/1987 | Hartmann | 280/238 |
| 4,721,015 | 1/1988 | Hartmann | 280/260 |
| 4,770,433 | 9/1988 | Hartmann | 280/238 |

FOREIGN PATENT DOCUMENTS 2074958 11/1981 United Kingdom ................ 280/261

*Primary Examiner*—Charles A. Marmor
*Assistant Examiner*—Wook Yoon

[57] ABSTRACT

An enclosed multiple speed drive for a tandem bicycle locates the pedal drive shaft for the rear rider on the axis of the rear wheel. The drive features a chain case which replaces the chain stay on the right side of the bicycle and an improved ten speed planetary transmission housed within a gear case inside the rear wheel hub. The chain case is press fit on a steel tube rotatably mounted in the bottom bracket, and a chain case cover on the right side, and a sun gear carrier on the left side, are clamped in the rear dropouts with over center quick releases. To change the rear tire, the chain case cover and the sun gear carrier are released from the dropouts and the chain case is rotated about the axis of the bottom bracket to swing the wheel clear of the frame. The tire can then be peeled off the rim from the left side and replaced without removing the wheel from the gear case or disturbing any of the drive train components.

7 Claims, 4 Drawing Sheets

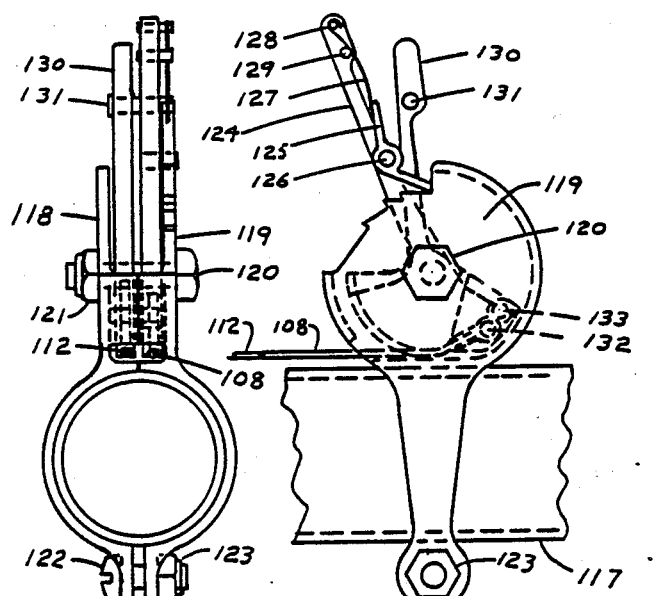
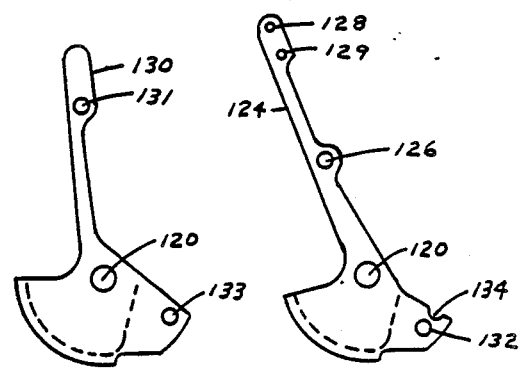
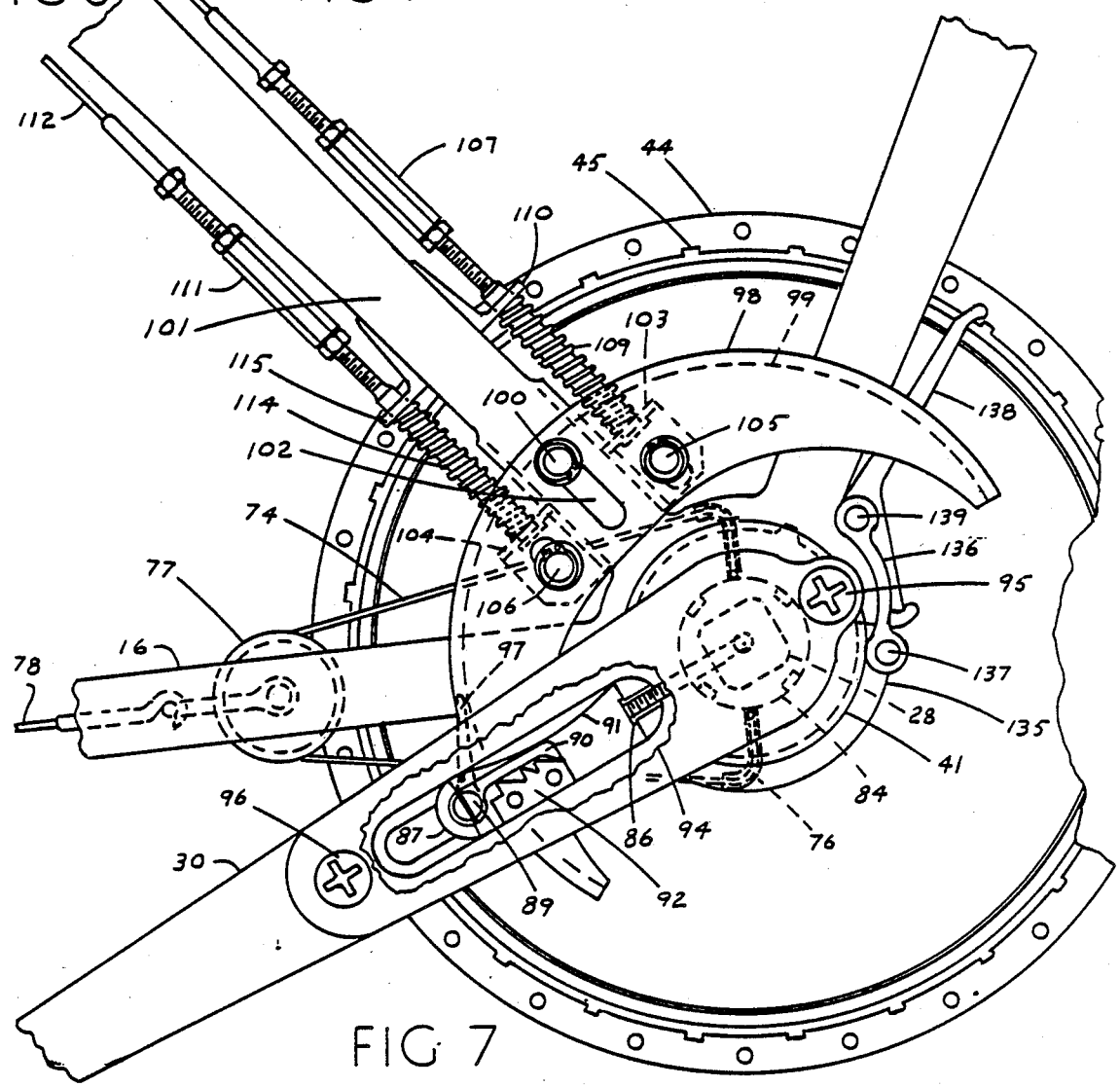

FULLY ENCLOSED MULTIPLE SPEED DRIVE FOR A CHAIN DRIVEN TANDEM BICYCLE

BACKGROUND OF THE INVENTION

1. Field of the invention

This invention relates generally to multiple speed epicyclic or planetary transmissions housed within the hub of the rear wheel of chain driven tandem bicycles with the pedal drive shaft for the rear rider on the axis of the rear wheel, coupled with a modification of a conventional bicycle frame which permits the chain to be fully enclosed.

2. Description of the Prior Art

Multiple speed bicycles commonly use either a chain and derailleur system or a chain driven rear hub employing one or more epicyclic gear trains. Tandem bicycles commonly use the chain and derailleur system with two bottom brackets and a long wheel base which increases maneuvering difficulty, particularly for offroad riding. On all chain driven bicycles the chain must be kept reasonably clean and well oiled for efficient operation and to prevent premature chain failure and chain maintenance becomes particularly troublesome if the bicycle is ridden extensively on dirt roads and trails. With the current popularity of offroad riding for recreation, a sealed chain drive which essentially eliminates chain maintenance is needed for a multiple speed tandem bicycle with a short wheel base, which can serve for single rider commuting as well as offroad recreational riding for couples. The object of the present invention is to satisfy that need.

SUMMARY OF THE INVENTION

The enclosed multiple speed drive for tandem bicycles in accordance with the present invention includes a chain case, preferably of die cast aluminum, with a chain case cover which is attached to it with flush head screws. The chain case is press fit on a steel tube which is rotatably mounted inside an otherwise conventional bottom bracket, and a short cylindrical extension on the chain case cover is clamped in the rear dropout with an over center quick release. The chain case and cover replace the chain stay on the right side and react the load from drive chain tension. They enclose a pair of equal size sprockets fixed on a pedal drive shaft rotatably mounted in the bottom bracket; an equal size sprocket fixed on a rear pedal drive shaft rotably mounted on the axis of the rear wheel; a reduced size sprocket fixed on a drive fitting rotably mounted on the rear pedal drive shaft inside the outer sprocket; and a pair of conventional bicycle chains coupling the pair of sprockets fixed on the forward pedal drive shaft with the fixed sprocket and the drive fitting mounted sprocket on the rear pedal drive shaft.

The ten speed planetary transmission in accordance with this invention is housed in a gear case inside the hub of the rear wheel and includes a single ring gear; a sun gear carrier which is clamped with an over center quick release in the rear dropout on the left side; four sun gears rotatably mounted on the sun gear carrier with a sun gear selector whose axial position is adjustable fog locking any selected one of the sun gears to the sun gear carrier; a single planet gear carrier; four sets of planet gears rotatably mounted on the planet gear carrier with three planet gears in each set in constant mesh with the ring gear and one of the four sun gears; a drive selector slidably mounted inside the drive fitting with its axial position adjustable for driving the ring gear from the pedal drive shaft or either the ring gear or the planet gear carrier from the drive fitting; two conventional one way clutches coupling respectively the ring gear and the planet gear carrier with the gear case, with the pawls of the clutch driving the gear case from the ring gear arranged to be disengaged from the gear case through engagement with the drive selector when the drive selector is in the second one of its four axial positions; a center pin installed in a hole through the rear pedal drive shaft with the center pin connected by a cross pin and ball bearing with the drive selector, and connected by a small chain with a means installed in the left rear pedal crank arm for adjusting the axial position of the center pin from shift levers located on the forward top tube; and a cable assembly installed in axial grooves in the sun gear carrier and connected to the sun gear selector and, through cable guides, to shift levers located on the forward down tube for adjusting the axial position of the sun gear selector.

An over center quick release comprising a cap link pinned to the bicycle frame, a pair of spring links pinned to the cap link, and a handle pinned to the spring links is used to clamp an integral cylindrical extension of the chain case cover in the frame dropout on the right side, and an integral cylindrical extension of the sun gear carrier in the frame dropout on the left side, by placing the nose of the handle in a notch in the frame and rotating the handle up and forward forcing the spring links over center.

The wheel hub is installed on the gear case from the left side with internal ribs on the wheel hub engaging external grooves in the gear case for the transfer of torque to the wheel. The wheel hub is restrained axially by a wire snap ring on the gear case on the right side and a nut threaded on the gear case from the left side.

BRIEF DESCRIPTION OF THE DRAWINGS

FIG. 7 is a partial side elevation view of the rear hub looking from the left side;

FIG. 8 is a section taken along the line 8—8 of FIG. 1;

FIG. 9 is a side elevation view of FIG. 8;

FIG. 10 shows a separated side elevation of the downshift handle shown in FIG. 9;

FIG. 11 shows a separated side elevation of the upshift handle shown in FIG. 9.

DESCRIPTION OF THE PREFERRED EMBODIMENT

Figure 3:
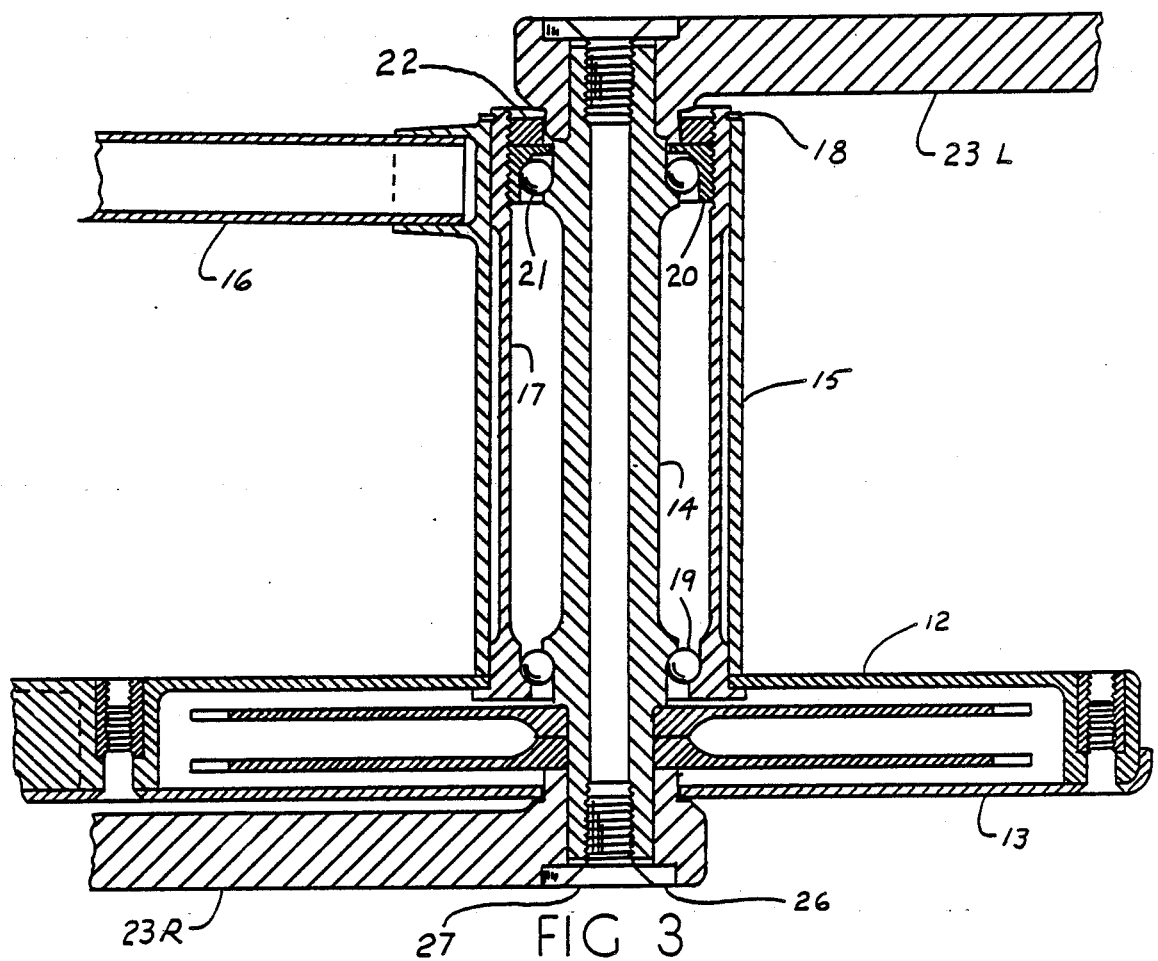
FIG. 3 is a section taken along the line 3—3 of FIG. 1.

Referring to FIG. 3, the enclosed chain drive in accordance with the present invention includes a chain case 12, a chain case cover 13 which is fastened to the chain case with flush head screws; a forward pedal drive shaft 14; a bottom bracket 15 which is integral with the bicycle frame and conventional except that the chain case 12 and cover 13 replace the chain stay on the right side; a conventional chain stay 16 on the left side; a bearing tube 17 which is a press fit in the chain case 12 and rotatably mounted in the bottom bracket 15; and a pair of chain sprockets 24 and 25 which are driven from the pedal drive shaft 14 by the pedal crankarms 23L and 23R. The ends of the drive shaft 14 are square for the transfer of torque from the crankarms to the sprockets 24 and 25. The bearing tube 17 is restrained axially by an integral shoulder engaging the chain case 12 and a snap ring 18 engaging the left side of the bottom bracket 15. The bearing tube 17 serves as the outer race for the conventional crankset ball bearings 19 on the right side, and is threaded on its left end for receiving the bearing nut 20 used for adjusting the preload of the crankset bag bearings 19 and 21, and the locknut 22 used to secure that preload. The sprockets 24 and 25 are clamped between a shoulder on the drive shaft 14 and the crankarm 23R by the washer 26 and flush head screw 27. A shoulder on the crankarm 23R is a close running fit inside the chain case cover 13, and a shoulder on the crankarm 23L is a close running fit inside the locknut 22 to minimize the intrusion of dirt.

Figure 2:
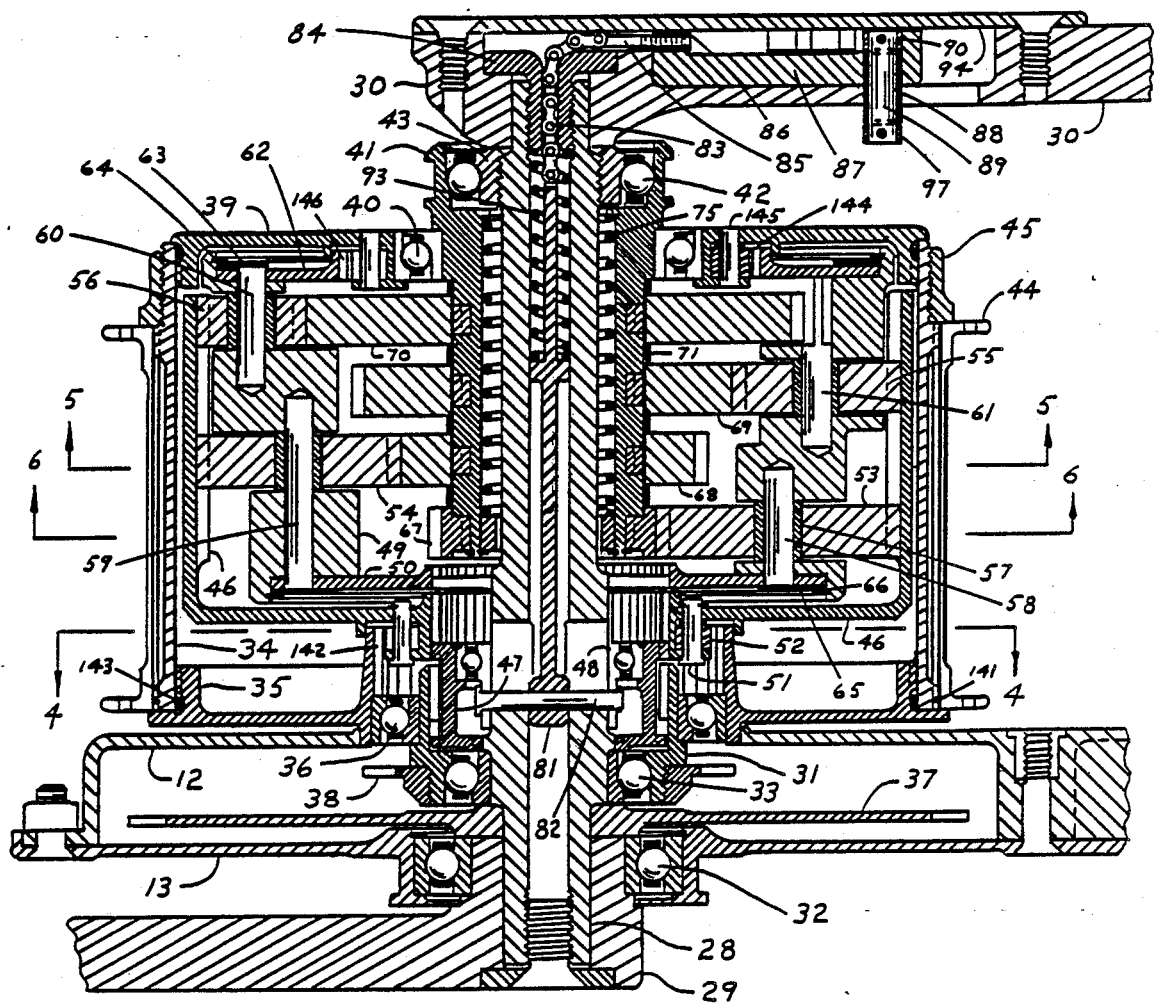
FIG. 2 is a section taken along the line 2—2 of FIG. 1.

Referring now to FIG. 2, the ten speed planetary transmission in accordance with the present invention includes a pedal drive shaft 28 which is supported on its right end by ball bearing 32 with its inner race seated on a shoulder on the right pedal crankarm 29, and its outer race seated inside the chain case cover 13; a left side pedal crankarm 30; a drive fitting 31 which is seated on an angular contact ball bearing 33 and which is driven by the small sprocket 38; a gear case 34; a gear case closing plate 35 which is supported by an angular contact ball bearing 36 seated on the drive fitting 31; a gear case closing plate 39 seated on an angular contact ball bearing 40 with its inner race seated on a sun gear carrier 41 which is supported by an angular contact ball bearing 42; a ring gear 46; a drive selector 47; and a planet gear carrier 49. The inner bearing race 43 is threaded on the drive shaft 28 near its left end and is used to adjust the axial preload of the angular contact ball bearings 33, 36, 40, and 42 which holds the gear case closing plates 35 and 39 firmly seated against the ends of the gear case 34. The bearing preload is secured by the bolt 84 which clamps the pedal crankarm 30 against the bearing race 43.

Figure 5:
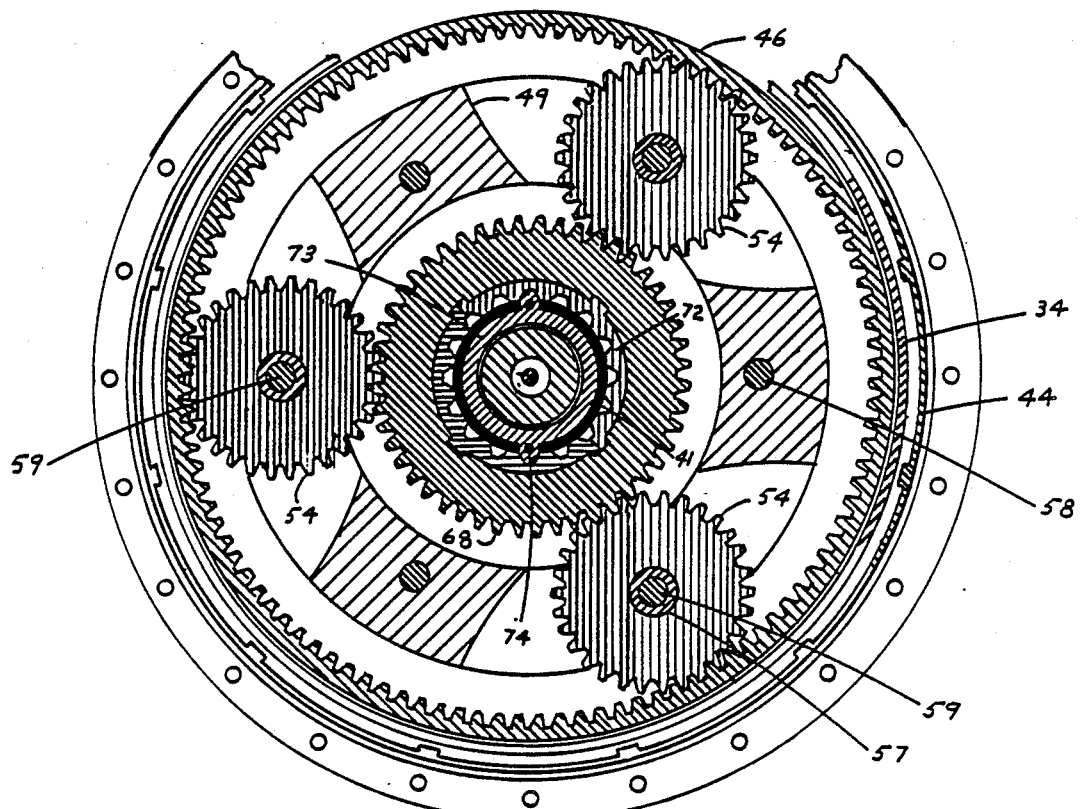
FIG. 5 is a section taken along the line 5—5 of FIG. 2.
Figure 6:
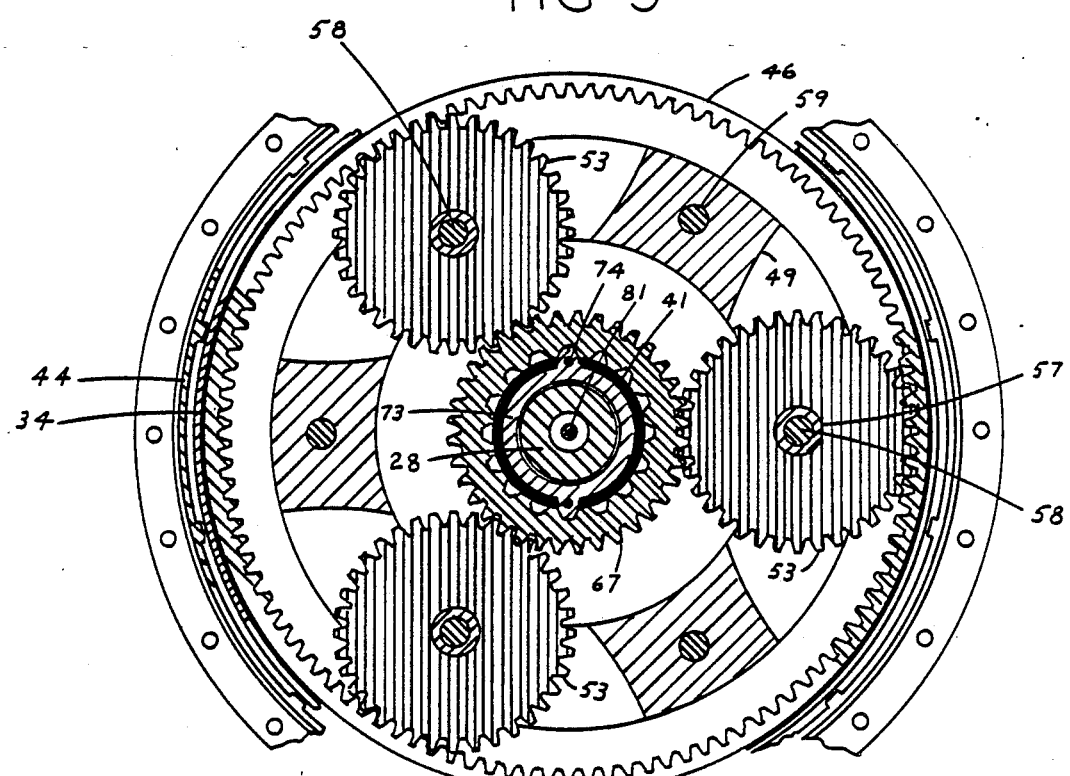
FIG. 6 is a section taken along the line 6—6 of FIG. 2.

As shown in FIGS. 2, 5, and 6, there are four sets of planet gears with three planet gears in each set. Each of the three largest planet gears 53, with an oil filled sintered bronze bushing 57 press fit into it, is mounted on a pin 58 which is installed in the planet gear carrier 49 from the right end, with each of the planet gears 58 in constant mesh with the ring gear 46 and with a sun gear 67 mounted on the sun gear carrier 41. Each of the three planet gears 54 is mounted on a pin 59 which is installed in the planet gear carrier 49 also from the right end, with each of the planet gears 54 in constant mesh with the ring gear 46 and with a sun gear 68 mounted on the sun gear carrier 41. A planet gear carrier driving plate 50 is mounted on the ends of the three pins 58 and on the three pins 59 for torque transfer from the driving plate 50 to the the planet gear carrier 49. The pins 58 and 59 are retained in their mounting holes by a thin washer 65 located between the driving plate 50 and a snap ring 66 installed in the right end of the planet gear carrier 49.

Each of the three smallest planet gears 56 is mounted on a pin 60 which is installed in the planet gear carrier 49 from its left end, with each of the planet gears 56 in constant mesh with the ring gear 46 and with a sun gear 70 mounted on the sun gear carrier 41. A planet gear carrier driven plate 62 is installed on the outboard ends of the pins 60 which are retained in their mounting holes in the planet gear carrier 49 by a thin washer 63 which is located between the driven plate 62 and a snap ring 64 installed in the left end of the planet gear carrier 49. Each of the remaining three planet gears 55 is mounted on a pin 61 which is installed in the planet gear carrier 49 from the left end, with each of the planet gears 55 in constant mesh with the ring gear 46 and with a sun gear 69 mounted on the sun gear carrier 41. The outboard end of the pin 61 has a reduced diameter to clear the sun gear 70, and each of the three pins 61 is retained in its mounting hole in the planet gear carrier 49 by the planet gear carrier driven plate 50. The axial position of the planet gear carrier 49 is constrained by the driven plate 62 contacting the gear case closing plate 39, and by the driving plate 50 contacting a small diameter lip on the ring gear 46. The axial position of the ring gear 46 is constrained by the ring gear contacting the gear case closing plate 35 or the planet gear carrier drive plate 50.

Figure 4:
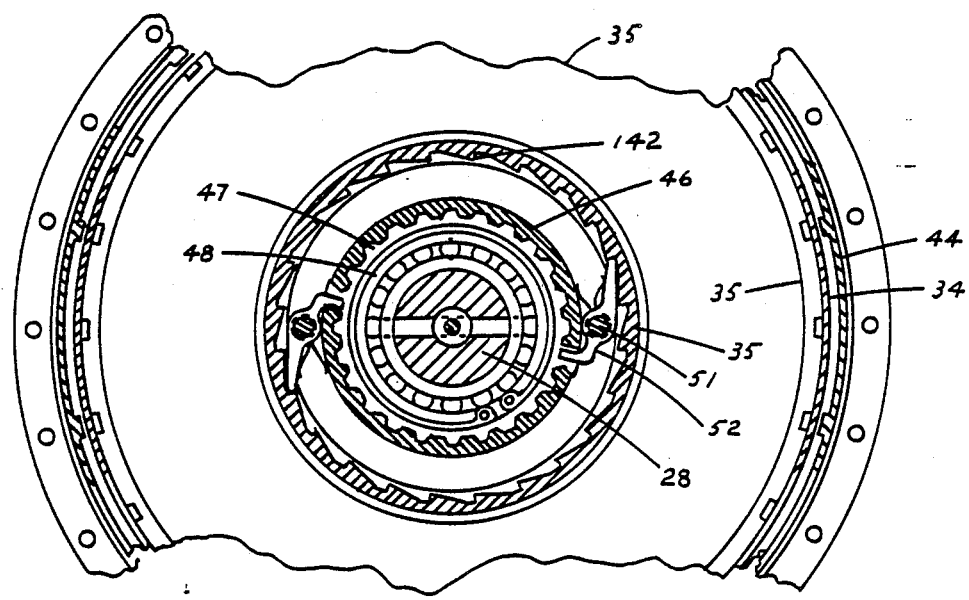
FIG. 4 is a section taken along the line 4—4 of FIG. 2.

As shown in FIGS. 2 and 4, a one way clutch couples the ring gear 46 with the gear case closing plate 35. The clutch pawls 52 are mounted on pawl pins 51 which are installed in the ring gear 46, and the clutch ratchet teeth 142 are integral with gear case closing plate 35. A similar one way clutch couples the planet gear carrier 49 and the gear case closing plate 39 except that the clutch pawls 144 are mounted on pawl pins 145 installed in the gear case closing plate 39, and the clutch ratchet teeth 146 are integral with the planet gear carrier driven plate 62.

The wheel hub 44 is installed over the gear case 34 with internal ribs on the wheel hub 44 engaging external slots on the gear case 34, and short internal ribs on the ends of the gear case 34 engaging external slots in the gear case closing plates 35 and 39, providing for drive torque transfer from the one way clutches to the wheel. The axial position of the wheel hub 44 is fixed on the right side by the internal ribs on the wheel hub 44 engaging a wire snap ring 141 installed in a groove in the gear case 34, and a spanner nut 45 which is threaded on the gear case and tightened against the wheel hub flange on the left side.

As shown in FIGS. 2 and 4, a drive selector 47 is installed in the anular space between the drive fitting 31 and the drive shaft 28, with an internal spline on the outboard end of the drive selector 47 which mates with an external spline on the drive shaft 28, and an external spline on the outboard end of the drive selector 47 which mates with an internal spline on the drive fitting 31. The drive selector has an external spline on its inboard end which mates with internal splines on both the ring gear 46 and the planet gear carrier driving plate 50.

The drive selector 47 is connected through a bearing 48 and a cross pin 82 with a center pin 81 installed in a hole through the center of the drive shaft 28. The cross pin 82 is located in a narrow slot through the drive shaft 28 which permits axial travel of the cross pin 82. Axial positioning of the center pin 81 is determined by a compression spring 93 which forces the cross pin 82 to the outboard end of its axial slot in the drive shaft 28 where the internal spline on the outboard end of the drive selector is meshed with the external spline on the drive shaft 28 the external spline on the outboard end of the drive selector 47 is disengaged so that the drive fitting 31 rotates freely, and the external spline on the inboard end of the drive selector 47 is meshed with the internal spline on the ring gear 46 for driving the ring gear 46 from the drive shaft 28. With the drive selector 47 in this position, the chain coupling the small sprocket 38 with the inboard sprocket 25 is unloaded; torque from the forward pedal drive shaft 14 is carried to the aft pedal drive shaft 28 by the outer sprockets 24 and 37 and directly from the drive shaft 28 to the wheel through the ring gear clutch; the transmission gears are unloaded; the ring gear rotates at the speed of the pedal drive shafts 14 and 28, the planet gear carrier 49 rotates more slowly, and the pawls 144 on the gear case closing plate 39 overrun the ratchet teeth on the planet gear carrier driven plate 62.

Referring to FIGS. 2 and 7, the center pin 81 is connected by a small chain 83 to a pin 85 which is threaded on its outer end for mating with a flanged end fitting 86 located in a slot in a block 87 which is slidably mounted in a milled pocket in the left pedal crank arm 30. The block 87 is retained in the pocket by a cover 94 which is clamped in position on the crank arm 30 by the flush head screws 95 and 96. As shown in FIG. 7, the axial position of the block 87 in the pocket is determined by the end of the pocket as shown, or by the latch 90 and the latch stop 92 which is riveted to the cover 94. A sleeve 88 is press fit in the block 87 and extends inward through a slot in the crank arm 30. A pin 89 is rotatably mounted in the sleeve 88 and the latch 90 is riveted on its outboard end and a cam follower 89 is riveted on its inboard end. A spring 91 holds the latch 90 pressed against the latch stop 92.

An upshift cam 90 and a downshift cam 99 are mounted on a pin 100 welded to the diagonal frame member 101. The pin 100 extends outward through a slot 102 in the cams 90 and 99 which are secured on the pin 100 by a washer and snap ring. A pin 105 is fixed on a cam guide 103 and extends outward through a short slot in the downshift cam 99 and through a tight fitting hole in the upshift cam 98 with the cams secured on the pin 105 by a washer and snap ring. A pin 106 is fixed on a cam guide 104 and extends outward through a tight fitting hole in the downshift cam 99 and through a short slot in the upshift cam 98 with the cams secured on the pin 106 by a washer and snap ring. The cam guides 103 and 104 fit under short flanges on each side of the frame member 101 and prevent the cams from moving outward or laterally but permit axial sliding. An upshift turnbuckle 107 and a downshift turnbuckle 111, each with a flange on its lower end, are installed through holes in the cam guides 103 and 104 respectively, and pass out through holes in angles 110 and 115 fixed on the frame member 101, with compression springs 109 and 114 installed between the cam guides 103 and 104 and the angles 110 and 115.

Figure 1:
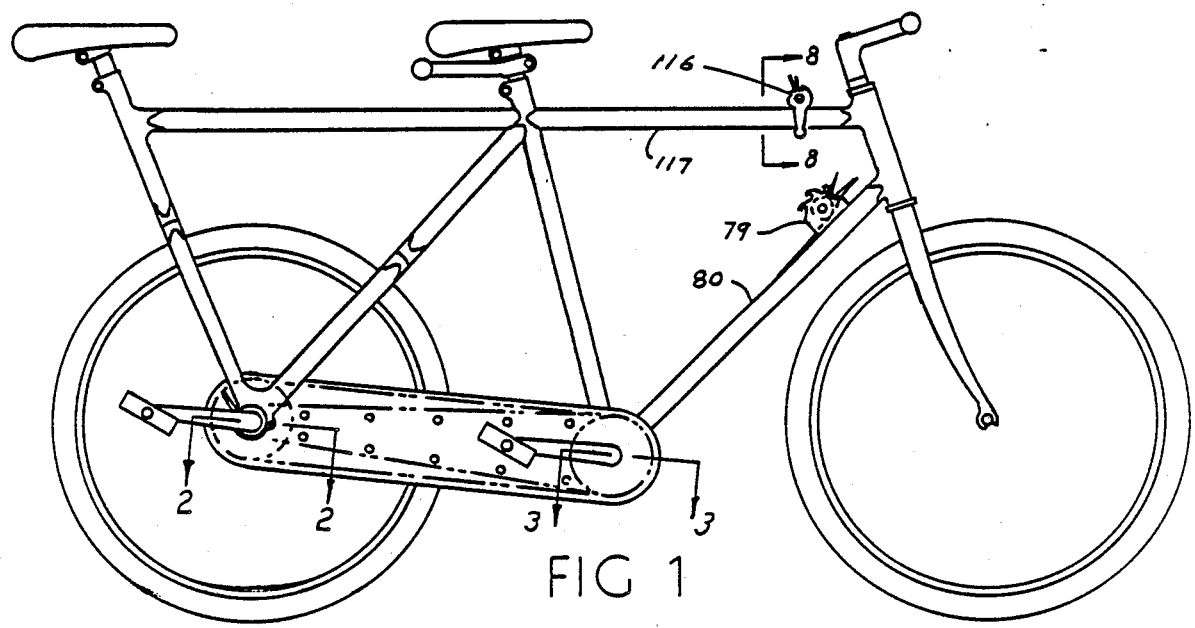
FIG. 1 is a side elevation view of a tandem bicycle with an enclosed chain drive and a ten speed planetary transmission in a gear case inside the hub of the rear wheel in accordance with the present invention.

The upshift turnbuckle 107 is connected by a cable 108 and a pin 132 to an upshift lever 124 installed in a shift assembly 116 mounted on the bicycle frame top tube 117 as shown in FIGS. 1, 8, and 9, with a separate detail of the upshift lever 124 shown in FIG 11. The downshift turnbuckle 111 is connected by a cable 112 and a pin 133 to a downshift lever 130 in the shift assembly 116 as shown in FIGS. 1, 8, and 9, with a separate detail of the downshift lever 130 shown in FIG. 10. The shift levers 124 and 130 are mounted on a bolt 120 between a left half 118, and a right half 119 of a shift assembly case. The bolt 220 with a nut 121, and a lower screw 122 and nut 123, clamps the case halves 118 and 119 in position on the top tube 117. The bolt 120 is located at the center of a circular arc on the shift levers 124 and 130 around which the cables 112 and 108 wrap when the levers are rotated. The case right half 119 has four notches for engaging a latch 125 which is rotatably mounted on a pin 126 rigidly fixed on the side of the upshift lever 124 as shown in FIGS. 8 and 9. A spring 127, which is mounted on two small pins 128 and 129 extending out the right side of the upshift lever 124, forces the latch 125 into engagement with the notches preventing tension in the cables from rotating the shift levers 124 and 130. The downshift lever 130 has a pin 131 extending out its right side which engages the latch 125 and rotates it so that it clears the notches when the levers 124 and 130 are squeezed together. When the upshift lever 124 is rotated aft, a notch 134 in the lever 124, as shown in FIG. 11, engages the pin 133 in the downshift lever 130 rotating both levers through the same angle and lifting the upshift cam 98 and the downshift cam 99 equal distances. When the crankarm 30 is rotated after the cam 98 has been lifted with the upshift lever 124, the cam 98 contacts the sleeve 88 (shown in FIG. 2) and slides the block 87 (shown in FIG. 7) outward in the crankarm pocket pulling the center pin 81 and drive selector 47 (shown in FIG. 2) inboard. The latch 90, latch spring 91, and latch stop 92 (shown in FIG. 7) prevent the compression spring 93 (shown in FIG. 2) from driving the shift selector 47 outboard. When the downshift lever 130 and upshift lever 124 are squeezed together, the downshift cam 99 is raised relative to the upshift cam 98 so that when the crank arm 30 is positioned near the center of the cams, the cam follower 97 (shown in FIG. 7) contacts the raised downshift cam 99 and rotates the latch 90 out of engagement with the latch stop 92 permitting the spring 93 to force the drive selector 47 outboard as the shift levers 124 and 130 are rotated forward while still squeezed together. The turnbuckles 107 and 111 are adjusted so that the sleeve 88 and cam follower 97 both clear the cams 98 and 99 respectively, when the crankarm 30 is rotated with the shift levers released in any position. Thus the principal purpose for the latch 125 on the upshift lever is to indicate the position of the drive selector 47.

Referring now to FIG. 4, when the drive selector 47 is pulled inboard one notch using the shift lever 124, the spline teeth on drive selector 47 engage the ring gear clutch dogs 52 and rotate them out of engagement with the ratchet teeth 142 on the gear case closing plate 35. With the drive selector in this position the ring gear is driven at the speed of the sprocket 38 and the planet gear carrier clutch drives the wheel at a reduced rate of speed. When the drive selector 47 is moved inboard another notch, the ring gear clutch dogs 52 are reengaged, the ring gear 46 is driven at the speed of the sprocket 38 and the wheel is driven at the speed of the ring gear. When the drive selector 47 is moved in another notch to its most inboard position, it meshes with the planet gear carrier driving plate 50 driving the planet gear carrier 49 at the speed of the sprocket 38, with the ring gear 46 driving the wheel at a multiplied rate of speed.

Referring again to FIG. 2, the four sun gears 67, 68, 69 and 70 are rotatably mounted on the sun gear carrier 41 with spacers 71 between adjacent sun gears. As shown in FIG. 7, the sun gear carrier 41 is clamped in the left rear dropout by a quick release assembly comprising a cap link 135 rotatably pinned to the frame at the forward side of the dropout; a pair of spring links 136 rotatably joined to the cap link 135 by the pin 137; and a handle rotatably joined to the spring links 136 by the pin 139. The sun gear carrier is clamped in the dropout by placing the nose of the handle 138 in a notch in the frame and rotating the handle up and forward forcing the spring links 136 overcenter.

As shown in FIGS. 2 and 5, the sun gears 68, 69, and 70 are each centered over a circumferential groove in the sun gear carrier in which a pair of ring halves 72 are installed. Radial projections on the ring halves 72 key them to the sun gear located in their plane and each pair of ring halves with its mating sun gear rotates freely in its groove until a sun gear selector 73, which is located in the anular space between the drive shaft 28 and the sun gear carrier 41, is moved into its plane. A pair of diametrically opposed radial arms on the sun gear selector 73 extend radially outward into internal slots in the sun gear carrier 41 which extend axially the length of the sun gear carrier. A tooth form on the ends of the radial arms mates with an internal tooth form in the ring halves 73 and locks them to the sun gear carrier 41. As shown in FIGS. 2 and 6, an internal tooth form matching that on the ring halves 73 is integrally machined in the sun gear 67 and no intermediate ring halves are needed for it to mate with the radial arms on the sun gear selector 73. The axial position of the sun gears on the sun gear carrier 41 is maintained by an integral shoulder at the left end, thin cylindrical spacers 71 located between the gears, and a snap ring which retains the end sun gear 67 on the carrier 41.

The axial position of the sun gear selector 73 (shown in FIG. 6) is controlled with a compression spring 75 (shown in FIG. 2) which drives the selector toward an end position against an internal snap ring in the carrier 41, and a cable 74 (shown in FIG. 6), both ends of which are clamped in the radial projections in the sun gear selector 73. As shown in FIG. 7, the cable 74 extends down the length of the two axial slots in the sun gear carrier 41, out through two cable guides 76 located in the carrier 41 just inboard of the interface between the sun gear carrier and the left side dropout, and wraps around a pulley 77. The pulley 77 is connected by a cable 78 which passes through a cable guide under the bottom bracket, to a shift assembly 79 mounted on the down tube 80 as shown in FIG. 1. The shift assembly 79 is used to position the sun gear selector in the plane of any one of the four sun gears.

The transmission provides a direct drive with the ring gear 46 driven from the pedal drive shaft 28 with the ring gear clutch engaged; four low range speeds with the ring gear 46 driven from the drive fitting 31 with the ring gear clutch disengaged, and the planet gear carrier clutch driving the wheel at a reduced rate of speed; one speed with the ring gear driven from the drive fitting 31 with the ring gear clutch engaged; and four high range speeds with the planet gear carrier 49 driven from the drive fitting 31 with the ring gear clutch driving the wheel at a multiplied rate of speed.

In the example design developed to illustrate the present invention, 24 pitch involute gears with a 20 degree pressure angle and a 108 tooth ring gear were selected with a resultant pitch diameter of 4.5 inches for the ring gear 46. The number of teeth in each of the four sun gears and mating planet gears is given in the table following with the transmission gear ratio, and the bicycle ratio for a sprocket ratio of 2.43 for the inner sprockets (14 cogs for the chain sprocket 38, and 34 cogs for the chain sprocket 25). The table also gives the equivalent wheel diameter, and speed for a pedal speed of 80 RPM. N is the number of teeth in the selected sun gear and n is the number of teeth in its mating planet gears.

| SPEED | N | n | TRANSMISSION RATIO | BICYCLE RATIO | EQUIV.WHEEL DIAMETER | MPH |
|---|---|---|---|---|---|---|
| one | direct drive | | N A | 1.000 | 26 (inches) | 6.2 |
| two | 78 | 15 | .581 | 1.410 | 36.7 | 8.7 |
| three | 60 | 24 | .643 | 1.562 | 40.6 | 9.7 |
| four | 42 | 33 | .720 | 1.749 | 45.5 | 10.8 |
| five | 36 | 36 | .750 | 1.821 | 47.3 | 11.3 |
| six | direct drive | | 1.000 | 2.429 | 63.1 | 15.0 |
| seven | 36 | 36 | 1.333 | 3.237 | 84.2 | 20.0 |
| eight | 42 | 33 | 1.389 | 3.373 | 87.7 | 21 |
| nine | 60 | 24 | 1.556 | 3.778 | 98.2 | 23.4 |
| ten | 78 | 15 | 1.722 | 4.183 | 108.7 | 25.9 |

While this invention has been described in terms of a preferred embodiment, it is anticipated that persons skilled in the art will realize many possible modifications thereof. For example, roller or needle bearings could have been used instead of the oil filled sintered bronze bushings shown, to mount the planet gears in the planet gear carrier; or the transmission could be made twelve speed instead of ten through the addition of one more sun gears and its mating planet gears. It is therefore intended that the following appended claims be interpreted as including all such modifications as fall within the true scope and spirit of the present invention.

I claim:

1. In a tandem bicycle with a rear wheel with a central hub and a frame comprising a chain stay on one side only; a bottom bracket; a forward top tube; a forward seat tube with the centerline of said forward seat tube passing through the center of said bottom bracket; a down tube with the centerline of said down tube passing through the center of said bottom bracket; a rear seat tube and fork assembly with the extended centerline of said rear seat tube passing through the axis of rotation of said rear wheel; a pair of seat stays for said forward seat tube with the centerlines of said seat stays passing through the axis of rotation of said rear wheel; and a pair of rear dropouts located at the intersections of said seat stays with said rear seat tube and fork assembly; a fully enclosed multiple speed drive for a chain driven tandem bicycle comprising:

a steel bearing tube with a flange on one end rotatably mounted and axially captive in said bottom bracket;

a chain case press fit on said steel bearing tube inside said flange;

a forward pedal drive shaft mounted on conventional ball bearings within said steel bearing tube, with said steel bearing tube forming the outer race for said ball bearings on said chain case side, and a conventional bearing nut threaded in the opposite end of said steel bearing tube forming the outer race for said ball bearings on the outer side;

a locknut securing the position of said bearing nut; an inboard forward sprocket and an outboard forward sprocket located within said chain case and fixed on said forward pedal drive shaft for rotation therewith;

a rear pedal drive shaft rotatably mounted on the axis of rotation of said rear wheel;

an inboard rear sprocket fixed on a drive fitting rotatably mounted on said rear pedal drive shaft;

an outboard rear sprocket fixed on said rear pedal drive shaft for rotation therewith;

a conventional bicycle chain located within said chain case and trained around said inboard forward sprocket and said inboard rear sprocket for driving said drive fitting from said inboard forward sprocket;

a second conventional bicycle chain located within said chain case and trained around said outboard forward sprocket and said outboard rear sprocket for driving either one from the other of said sprockets;

a chain case cover rigidly attached to said chain case and enclosing said forward and said rear sprockets and said short cylindrical extension of said chain case cover in one of said rear dropouts;

left side and right side forward pedal crankarms fixed on opposite ends of said forward pedal drive shaft with a shoulder on one of said forward pedal crankarms a close running fit inside said chain case cover, and a shoulder on the other a close running fit inside said locknut;

a first pedal crank arm fixed on one end of said rear pedal drive shaft with a shoulder on said first pedal crank arm seated inside the inner race of a ball bearing with the outer race of said ball bearing seated inside said short cylindrical extension of said chain case cover, and a second pedal crank arm fixed on the other end of said rear pedal drive shaft;

a gear case rotatably mounted concentric with said rear pedal drive shaft inside said central hub of said rear wheel, with a means for fixing said central hub on said gear case;

an improved multiple speed planetary transmission located inside said gear case for driving said rear wheel, and including a sun gear carrier mounted concentric with said rear pedal drive shaft with a quick release means for clamping an end of said sun gear carrier in one of said rear dropouts;

multiple sun gears rotatably mounted on said sun gear carrier with a means for locking any selected one of said sun gears to said sun gear carrier;

a planet gear carrier located concentric with said sun gear carrier with a means for constraining the axial position of said planet gear carrier; multiple sets of planet gears rotatably mounted on said planet gear carrier with multiple planet gears in each set in constant mesh with each of said multiple sun gears;

an internally toothed ring gear in constant mesh with each of said multiple sets of planet gears with a means for constraining the axial position of said ring gear;

a first one way clutch driving said gear case from said ring gear;

a second one way clutch driving said gear case from said planet gear carrier;

a means for selectively driving said ring gear from said rear pedal drive shaft with said first one way clutch engaged and said drive fitting freely rotating;

a means for selectively driving said ring gear from said drive fitting with said first one way clutch disengaged;

a means for selectively driving said ring gear from said drive fitting with said first one way clutch engaged; and a means for selectively driving said planet gear from said drive fitting.

2. A fully enclosed multiple speed drive for a chain driven tandem bicycle with an improved multiple speed planetary transmission according to claim 1 wherein said means for selectively locking any one of said multiple sun gears to said sun gear carrier includes multiple external circumferential grooves and multiple internal axial grooves in said sun gear carrier; a pair of ring halves with multiple internal teeth and multiple external projections being installed in each of said external circumferential grooves with each pair of said ring halves centered inside one of said multiple sun gears; said external projections on said ring halves locking each pair of said ring halves to its associated sun gear for rotation therewith; a sun gear selector with multiple radial arms keyed to said internal axial grooves in said sun gear carrier; a tooth form on the ends of said radial arms matching the tooth form of said multiple internal teeth on said ring halves for engaging said internal teeth and locking the associated one of said multiple sun gears to said sun gear carrier; and wherein said sun gear selector is axially movable with a first shift means for selectively positioning said sun gear selector in the plane of any selected one of said multiple sun gears.

3. A fully enclosed multiple speed drive for a chain driven tandem bicycle with an improved multiple speed planetary transmission according to claim 1 wherein said means for selectively driving said ring gear from said rear pedal drive shaft, or for driving either said planet gear carrier or said ring gear from said drive fitting with said first one way clutch either engaged or disengaged, includes a drive selector located in the anular space between said drive fitting and said rear pedal drive shaft; internal teeth on an outboard end of said drive selector which mesh with external teeth on said rear pedal drive shaft with said drive selector positioned in a first location, and with said internal teeth on said drive selector meshing with nothing with said drive selector in any one of the other three of said locations; external teeth on an outboard end of said drive selector which mesh with nothing in said first location and mesh with internal teeth on said drive fitting in the other three of said drive selector locations; external teeth on the inboard end of said drive selector which mesh with internal teeth on said ring gear leaving said first one way clutch pawls engaged with said drive selector in said first and third locations but which rotate said first one way clutch pawls out of engagement in said second location; internal teeth on a driving plate fixed on said planet gear carrier which mesh with said external teeth on the inboard end of said drive selector in said fourth location; and a second shift means for selectively positioning said drive selector in any one of said four axial locations.

4. A fully enclosed multiple speed drive for a chain driven tandem bicycle with an improved multiple speed planetary transmission according to claim 2 wherein said first shift means for selectively positioning said sun gear selector in the plane of any one of said multiple sun gears includes a compression spring which forces said sun gear selector toward the inboard end of its axial travel; a pair of diametrically opposed radial holes through said sun gear carrier inboard of said sun gear carrier's interface with one of said frame dropouts, with the axis of said holes normal to said chain stay; said radial holes intersecting said internal axial grooves in said sun gear carrier; a cable guide inserted in each of said diametrically opposed radial holes, said cable guides rotating the direction of a cable passing through said guides to a direction parallel to said chain stay; a pulley located inboard of said chain stay with said cable wrapping 180 degrees around said pulley, through said cable guides and wrapping around an internal radius in said sun gear carrier to a direction aligned with said internal axial grooves, with both ends of said cable fastened in said radial arms on said sun gear selector; and a second cable with one end connected to an arm pivoted from said pulley, with said second cable passing through a cable guide under said bottom bracket and terminating in a shift mechanism mounted on said down tube.

5. A fully enclosed multiple speed drive for a chain driven tandem bicycle with an improved planetary transmission according to claim 3 wherein said second shift means for selectively positioning said drive selector in any one of four locations includes a bearing with the outer race of said bearing captive in said drive selector and the inner race of said bearing slidably mounted on said rear pedal drive shaft; an axial pin located in a hole through the center of said rear pedal drive shaft; a cross pin located in an axial slot through said rear pedal drive shaft with said cross pin connecting said axial pin with the inner race of said bearing; a compression spring driving said axial pin toward the outboard end of said axial slot; a hollow bolt clamping said second pedal crank arm on said rear pedal drive shaft; a small chain connected to the end of said axial pin; said small chain passing out through said hollow bolt and wrapping 90 degrees around a radius in said hollow bolt to connect to a threaded pin located in a slot in said pedal crank arm; a flanged end fitting mounted on the end of said threaded pin with said end fitting captive in a block slidably mounted in a pocket in said second pedal crank arm; a sleeve press fit in the end of said block; said sleeve extending through an axial slot through the bottom of said pocket; a pin rotatably mounted in said sleeve with said pin extending past both ends of said sleeve; a latch fixed on the outboard end of said pin; a cam follower fixed on the inboard end of said pin; a cover attached to said pedal crank arm with said cover enclosing said pocket and retaining said block; a latch stop fastened to said cover with four latch stop positions arranged to coincide with said four axial locations for said drive selector; a spring forcing said latch against said latch stop; an upshift cam and a downshift cam slidably mounted on said seat stay inboard of said second pedal crank arm; said upshift cam located to contact said sleeve when said upshift cam is lifted; said downshift cam located to contact said cam follower when said downshift cam is lifted relative to said upshift cam; compression springs forcing said cams toward the lower end of their axial travel; an upshift cable connecting said upshift cam with an upshift lever located in a shift mechanism mounted on said forward top tube; and a down shift cable connecting said downshift cam with a down shift lever in said shift mechanism mounted on said top tube.

6. A fully enclosed multiple speed drive for a chain driven tandem bicycle with an improved multiple speed planetary transmission according to claim 1 wherein said means for constraining the axial position of said planet gear carrier and said ring gear includes a first angular contact ball bearing supporting said sun gear carrier on said rear pedal drive shaft; a second angular contact ball bearing supporting a gear case closing plate on said sun gear carrier; a third angular contact ball bearing supporting said drive fitting on said rear pedal drive shaft; and a fourth angular contact ball bearing supporting a gear case closing plate on said drive fitting. The inner race of said first ball bearing is threaded on said rear pedal drive shaft to provide an axial preload of all of said angular contact ball bearings and said axial preload is secured by said hollow bolt which clamps said pedal crank arm against the inner race of said first ball bearing. Said axial preload forces both gear case closing plates in against said gear case and indexes their axial position relative to said pedal drive shaft. Said gear case closing plates restrain the axial position of said planet gear carrier and said ring gear.

7. A fully enclosed multiple speed drive for a chain driven tandem bicycle according to claim 1 wherein said quick release means for clamping said chain case cover or said sun gear carrier in said dropouts includes a cap link rotatably pinned to said bicycle frame on the forward side of each of said dropouts; a pair of spring links rotatably pinned to said cap link; a handle rotatably pinned to said spring links; and a notch in said frame on the aft side of each of said dropouts for receiving said handle.

* * * * *